US 6,676,923 B1

(12) United States Patent
Zones et al.

(10) Patent No.: US 6,676,923 B1
(45) Date of Patent: Jan. 13, 2004

(54) ZEOLITE SSZ-54 COMPOSITION OF MATTER AND SYNTHESIS THEREOF

(75) Inventors: Stacey Zones, San Francisco, CA (US); Allen W. Burton, Jr., Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 19 days.

(21) Appl. No.: 10/186,905

(22) Filed: Jun. 28, 2002

(51) Int. Cl.⁷ ............................................. C01B 39/48
(52) U.S. Cl. ..................... 423/718; 423/705; 423/708; 423/DIG. 35; 423/DIG. 36
(58) Field of Search ................... 423/705, 708, 423/718, DIG. 36, DIG. 35

(56) References Cited

U.S. PATENT DOCUMENTS 4,076,842 A * 2/1978 Plank et al.
4,551,321 A * 11/1985 Marosi et al.
5,053,373 A * 10/1991 Zones et al.
5,707,601 A * 1/1998 Nakagawa et al.
5,785,947 A * 7/1998 Zones et al.
6,471,941 B1 * 10/2002 Boix et al.

OTHER PUBLICATIONS

Szostak, Handbook of Molecular Sieves, Van Nostrand Reinhold, 1992, pp. 538–542.

* cited by examiner

Primary Examiner—David Sample
(74) Attorney, Agent, or Firm—Richard J. Sheridan (57) ABSTRACT

The present invention relates to new crystalline zeolite SSZ-54 prepared using a templating agent comprising N-isopropyl ethylenediamine, or a mixture of 1-N-isopropyl diethylenetriamine and isobutylamine, and processes employing SSZ-54 in a catalyst.

19 Claims, 4 Drawing Sheets

ZEOLITE SSZ-54 COMPOSITION OF MATTER AND SYNTHESIS THEREOF

BACKGROUND OF THE INVENTION

1. Field of the Invention

The present invention relates to new crystalline zeolite SSZ-54, a method for preparing SSZ-54 using a templating agent comprising N-isopropyl ethylenediamine, or a mixture of 1-N-isopropyl diethylenetriamine and isobutylamine, and processes employing SSZ-54 in a catalyst.

2. State of the Art

Because of their unique sieving characteristics, as well as their catalytic properties, crystalline molecular sieves and zeolites are especially useful in applications such as hydrocarbon conversion, gas drying and separation. Although many different crystalline molecular sieves have been disclosed, there is a continuing need for new zeolites with desirable properties for gas separation and drying, hydrocarbon and chemical conversions, and other applications. New zeolites may contain novel internal pore architectures, providing enhanced selectivities in these processes.

Crystalline aluminosilicates are usually prepared from aqueous reaction mixtures containing alkali or alkaline earth metal oxides, silica, and alumina. Crystalline borosilicates are usually prepared under similar reaction conditions except that boron is used in place of aluminum. By varying the synthesis conditions and the composition of the reaction mixture, different zeolites can often be formed.

SUMMARY OF THE INVENTION

The present invention is directed to a family of crystalline molecular sieves with unique properties, referred to herein as "zeolite SSZ-54" or simply "SSZ-54". Preferably, SSZ-54 is obtained in its silicate, aluminosilicate, titanosilicate, vanadosilicate or borosilicate form. The term "silicate" refers to a zeolite having a high mole ratio of silicon oxide relative to aluminum oxide, preferably a mole ratio greater than 100, including zeolites composed entirely of silicon oxide. As used herein, the term "aluminosilicate" refers to a zeolite containing both alumina and silica and the term "borosilicate" refers to a zeolite containing oxides of both boron and silicon.

Figure 1:
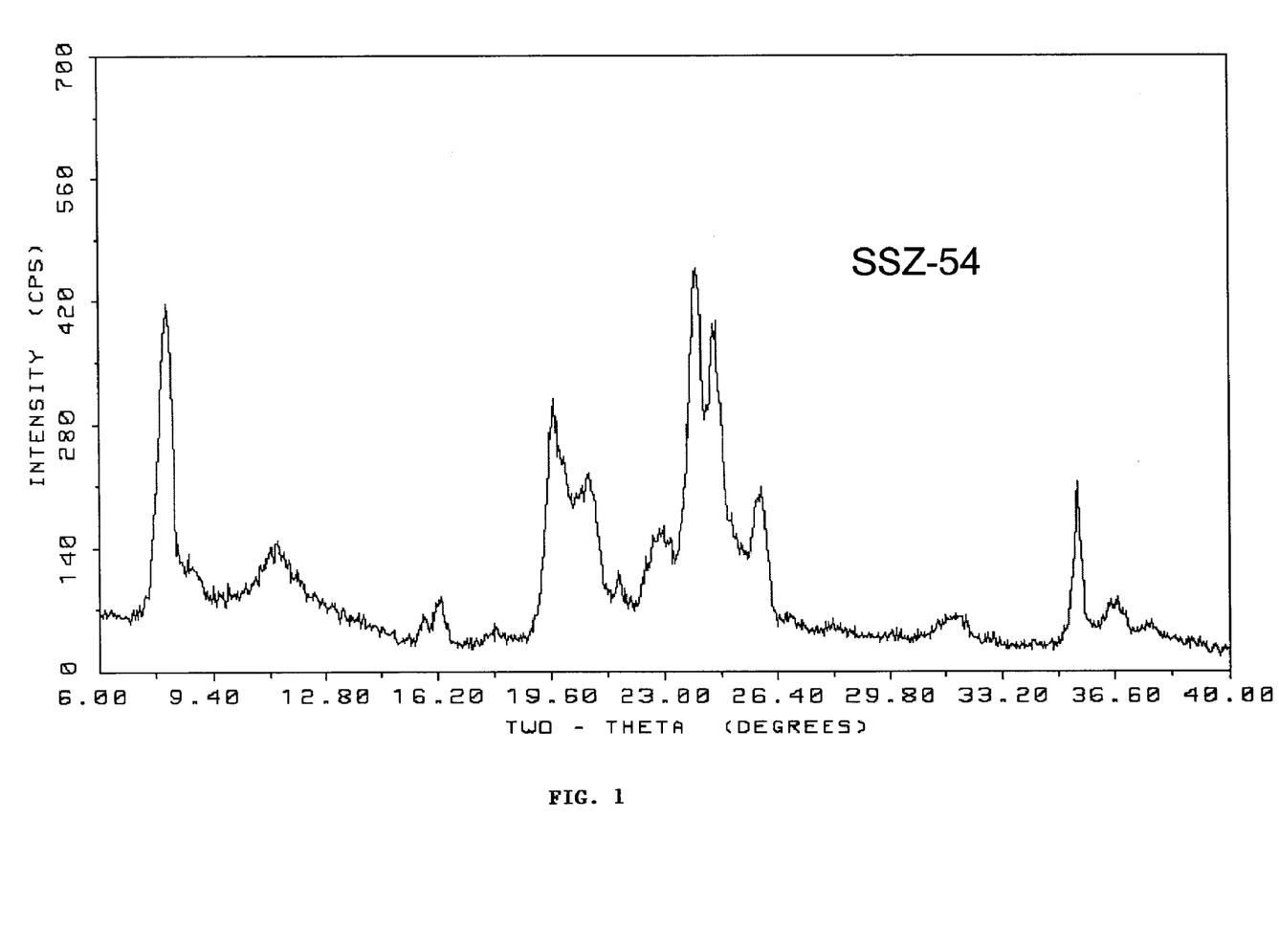
FIG. 1 is an X-ray diffraction pattern of a calcined sample of SSZ-54.

In accordance with this invention, there is provided a zeolite having a mole ratio greater than about 20 of an oxide of a first tetravalent element to an oxide of a second tetravalent element different from said first tetravalent element, trivalent element, pentavalent element or mixture thereof and having, after calcination, the X-ray diffraction pattern of FIG. 1.

Further, in accordance with this invention, there is provided a zeolite having a mole ratio greater than about 20 of an oxide selected from silicon oxide, germanium oxide and mixtures thereof to an oxide selected from aluminum oxide, gallium oxide, iron oxide, boron oxide, titanium oxide, indium oxide, vanadium oxide and mixtures thereof and having, after calcination, the X-ray diffraction pattern of FIG. 1.

The present invention further provides such a zeolite having a composition, as synthesized and in the anhydrous state, in terms of mole ratios as follows:

| | |
|---|---|
| $YO_2/W_cO_d$ | 25–100 |
| $M_{2/n}/YO_2$ | 0.02–0.06 |
| $Q/YO_2$ | 0.01–0.04 | wherein Y is silicon, germanium or a mixture thereof; W is aluminum, gallium, iron, boron, titanium, indium, vanadium or mixtures thereof; c is 1 or 2; d is 2 when c is 1 (i.e., W is tetravalent) or d is 3 or 5 when c is 2 (i.e., d is 3 when W is trivalent or 5 when W is pentavalent); M is an alkali metal cation, alkaline earth metal cation or mixtures thereof (M is preferably potassium); n is the valence of M (i.e., 1 or 2); and Q is N-isopropyl ethylenediamine, or a mixture of 1-N-isopropyl diethylenetriamine and isobutylamine.

In accordance with this invention, there is also provided a zeolite prepared by thermally treating a zeolite having a mole ratio of an oxide selected from silicon oxide, germanium oxide and mixtures thereof to an oxide selected from aluminum oxide, gallium oxide, iron oxide, boron oxide, titanium oxide, indium oxide, vanadium oxide and mixtures thereof greater than about 20 at a temperature of from about 200° C. to about 800° C., the thus-prepared zeolite having the X-ray diffraction pattern of FIG. 1. The present invention also includes this thus-prepared zeolite which is predominantly in the hydrogen form, which hydrogen form is prepared by ion exchanging with an acid or with a solution of an ammonium salt followed by a second calcination.

Also provided in accordance with the present invention is a method of preparing a crystalline material comprising an oxide of a first tetravalent element and an oxide of a second tetravalent element which is different from said first tetravalent element, trivalent element, pentavalent element or mixture thereof, said method comprising contacting under crystallization conditions sources of said oxides and a templating agent comprising N-isopropyl ethylenediamine, or a mixture of 1-N-isopropyl diethylenetriamine and isobutylamine.

DETAILED DESCRIPTION OF THE INVENTION

The present invention comprises a family of crystalline, medium pore zeolites designated herein "zeolite SSZ-54" or simply "SSZ-54". As used herein, the term "medium pore" means having an average pore size diameter greater than about 4.5–6 Angstroms.

Figure 2:
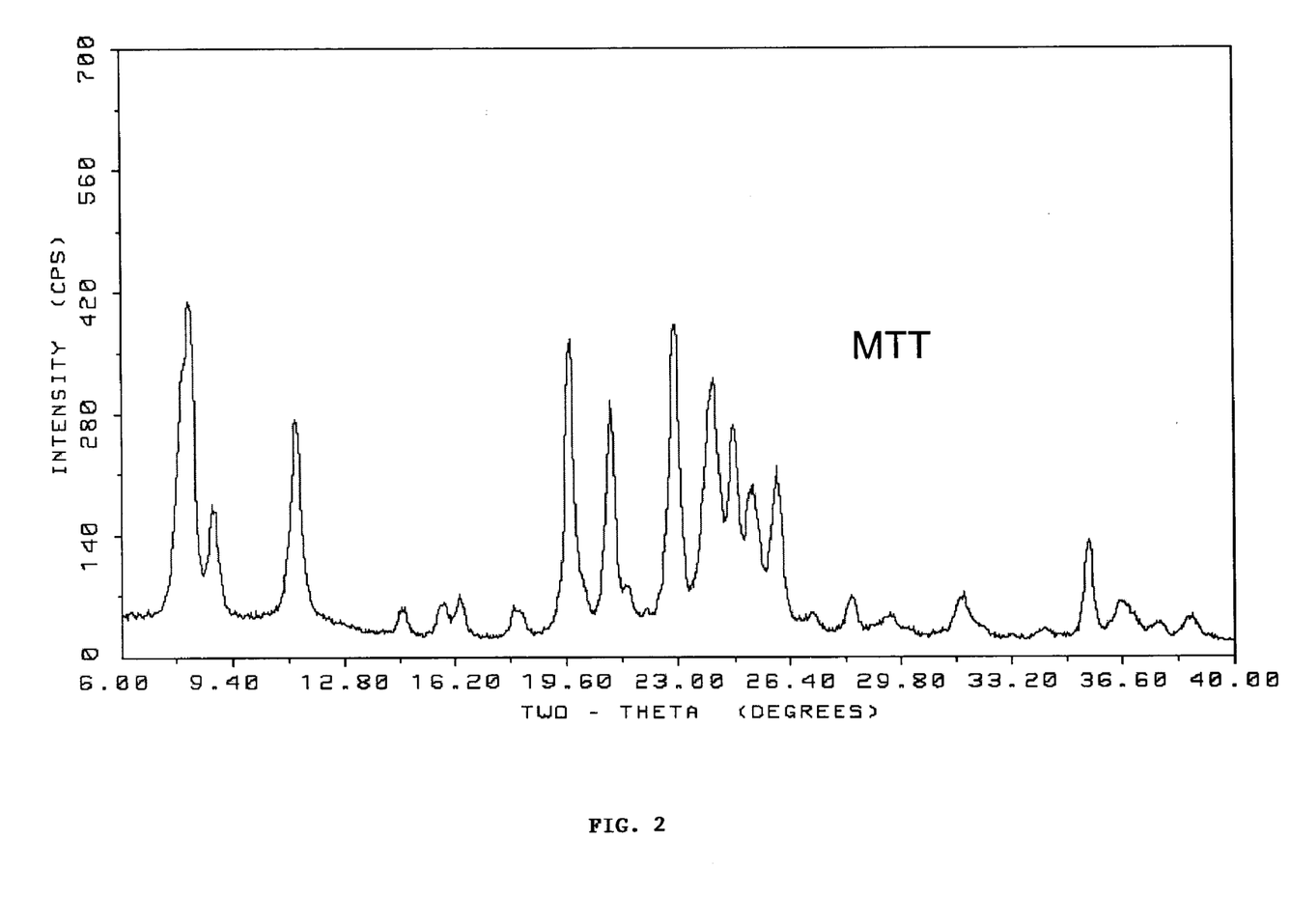
FIG. 2 is an X-ray diffraction pattern of a calcined sample of a zeolite having the MTT crystal structure.
Figure 3:
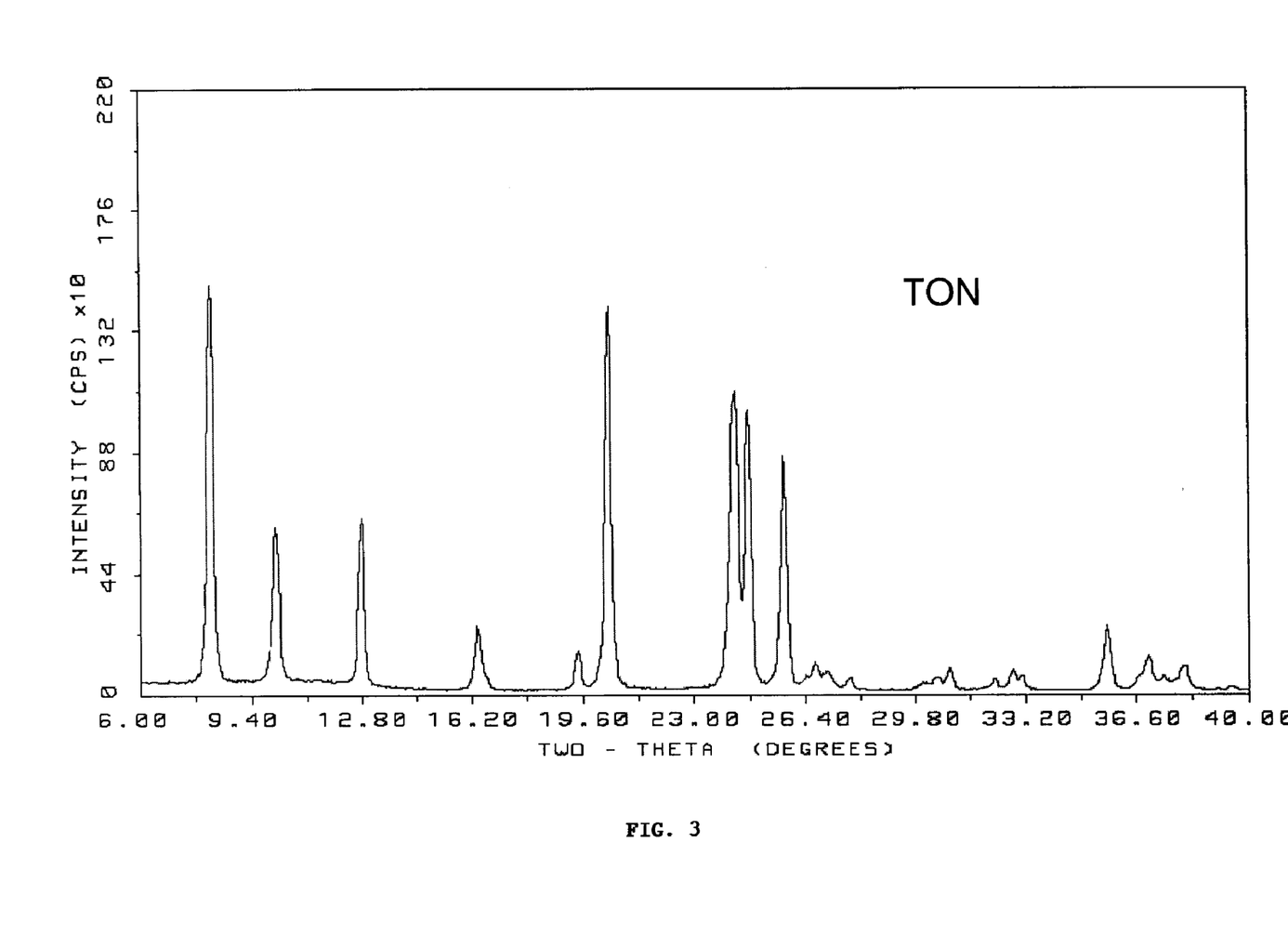
FIG. 3 is an X-ray diffraction pattern of a calcined sample of a zeolite having the TON crystal structure.

While not wishing to be bound by any particular theory, it is believed that SSZ-54 is an intergrowth of the MTT and TON crystal structures. FIG. 1 shows the X-ray diffraction pattern of a calcined sample of SSZ-54. FIG. 2 shows the X-ray diffraction pattern of a calcined sample of a pure phase zeolite having the MTT crystal structure, and FIG. 3 shows the X-ray diffraction pattern of a calcined sample of a pure phase zeolite having the TON crystal structure. It can be seen that there are similarities between the pattern for SSZ-54 and the patterns for MTT and TON.

Figure 4:
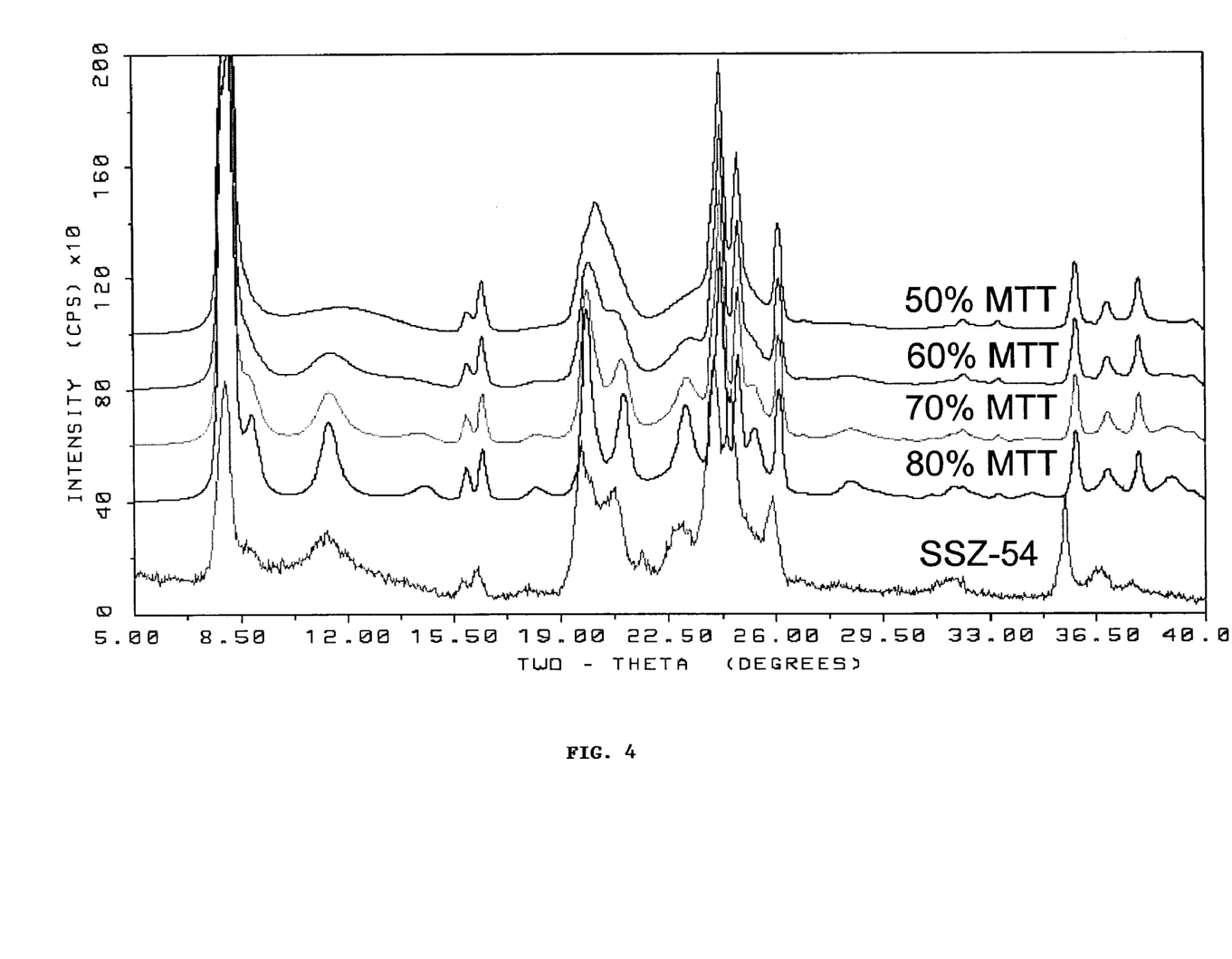
FIG. 4 shows calculated X-ray patterns of calcined zeolites having about 50%, 60%, 70% or 80% MTT crystal structure and the balance the TON crystal structure. For comparison purposes, FIG. 4 also shows the X-ray diffraction pattern for SSZ-54.

FIG. 4 shows calculated X-ray diffraction patterns for zeolites that are an intergrowth of the MTT and TON crystal structures. The calculated patterns are for intergrowths containing about 50%, 60%, 70% and 80% MTT and about 50%, 40%, 30% and 20% TON, respectively. FIG. 4 also shows the X-ray diffraction pattern for SSZ-54. It can be seen that there is a reasonably good correlation between the calculated pattern of 70% MTT/30% TON and the SSZ-54 pattern.

It is further believed that the peak broadening seen in the SSZ-54 pattern of FIG. 4 is due to disorder in the SSZ-54 crystal structure rather than exclusively to small crystal size. This is further evidence that SSZ-54 is an intergrowth of more than one crystal structure.

When needle-like crystals of SSZ-54 were examined by TEM, the cross-section showed TON and MTT domains within the same crystal. This is further evidence that SSZ-54 is an intergrowth of TON and MTT crystal structures.

After calcination, the SSZ-54 has a crystalline structure whose X-ray powder diffraction pattern includes the characteristic lines shown in Table I below.

TABLE I

Calcined SSZ-54

| Two Theta (deg.)[a] | Relative Intensity |
|---|---|
| 8.06 | VS |
| 8.78 | W |
| 11.32 | W |
| 15.82 | W |
| 16.28 | W |
| 17.97 | W |
| 19.64 | S–VS |
| 20.68 | VS |
| 22.92 | W–M |
| 24.00 | VS |
| 24.5 | VS |
| 25.94 | M |
| 31.76 | W |
| 35.48 | M |
| 36.62 | W |
| 37.65 | W |

[a] ±0.2

[b] The X-ray patterns provided are based on a relative intensity scale in which the strongest line in the X-ray pattern is assigned a value of 100: W(weak) is less than 20; M(medium) is between 20 and 40; S(strong) is between 40 and 60; VS(very strong) is greater than 60.

Table IA below shows the characteristic X-ray powder diffraction lines for calcined SSZ-54 including actual relative intensities.

TABLE IA

Calcined SSZ-54

| Two Theta (deg.)[a] | Relative Intensity |
|---|---|
| 8.06 | 68 |
| 8.78 | 10 |
| 11.32 | 17 |
| 15.82 | 8 |
| 16.28 | 4 |

TABLE IA-continued

Calcined SSZ-54

| Two Theta (deg.)[a] | Relative Intensity |
|---|---|
| 17.97 | 1 |
| 19.64 | 58 |
| 20.68 | 77 |
| 22.92 | 19 |
| 24.00 | 90 |
| 24.5 | 100 |
| 25.94 | 28 |
| 31.76 | 18 |
| 35.48 | 23 |
| 36.62 | 13 |
| 37.65 | 4 |

In preparing SSZ-54 zeolites, N-isopropyl ethylenediamine, or a mixture of 1-N-isopropyl diethylenetriamine and isobutylamine is used as a crystallization template (sometimes called a structure directing agent). In general, SSZ-54 is prepared by contacting an active source of one or more oxides selected from the group consisting of monovalent element oxides, divalent element oxides, trivalent element oxides, and tetravalent element oxides with the templating agent.

The templating agents of this invention have the following chemical structures:

N-isopropyl ethylenediamine

Isobutylamine

1-N-isopropyl diethylenetriamine

When the templating agent is a mixture of 1-N-isopropyl diethylenetriamine and isobutylamine, the mole ratio of 1-N-isopropyl diethylenetriamine to isobutylamine may be about 1:8.

SSZ-54 is prepared from a reaction mixture having the composition shown in Table A below.

TABLE A

Reaction Mixture

| | Typical | Preferred |
|---|---|---|
| $YO_2/W_aO_b$ | 25–100 | 30–70 |
| $OH^-/YO_2$ | 0.15–0.50 | 0.20–0.30 |
| $Q/YO_2$ | 0.10–1.00 | 0.10–0.40 |
| $M_{2/n}/YO_2$ | 0.03–0.20 | 0.05–0.15 |
| $H_2O/YO_2$ | 10–75 | 15–40 | where Y, W, Q, M and n are as defined above, and a is 1 or 2, and b is 2 when a is 1 (i.e., W is tetravalent) and b is 3 when a is 2 (i.e., W is trivalent).

In practice, SSZ-54 is prepared by a process comprising:
(a) preparing an aqueous solution containing sources of at least one oxide capable of forming a crystalline molecular sieve and the templating agent of this invention;
(b) maintaining the aqueous solution under conditions sufficient to form crystals of SSZ-54; and
(c) recovering the crystals of SSZ-54.

Accordingly, SSZ-54 may comprise the crystalline material and the templating agent in combination with metallic and non-metallic oxides bonded in tetrahedral coordination through shared oxygen atoms to form a cross-linked three dimensional crystal structure. The metallic and non-metallic oxides comprise one or a combination of oxides of a first tetravalent element(s), and one or a combination of a second tetravalent element(s) different from the first tetravalent element(s), trivalent element(s), pentavalent element(s) or mixture thereof. The first tetravalent element(s) is preferably selected from the group consisting of silicon, germanium and combinations thereof. More preferably, the first tetravalent element is silicon. The second tetravalent element (which is different from the first tetravalent element), trivalent element and pentavalent element is preferably selected from the group consisting of aluminum, gallium, iron, boron, titanium, indium, vanadium and combinations thereof. More preferably, the second trivalent or tetravalent element is aluminum or boron.

Typical sources of aluminum oxide for the reaction mixture include aluminates, alumina, aluminum colloids, aluminum oxide coated on silica sol, hydrated alumina gels such as $Al(OH)_3$ and aluminum compounds such as $AlCl_3$ and $Al_2(SO_4)_3$. Typical sources of silicon oxide include silicates, silica hydrogel, silicic acid, fumed silica, colloidal silica, tetra-alkyl orthosilicates, and silica hydroxides. Boron, as well as gallium, germanium, titanium, indium, vanadium and iron, can be added in forms corresponding to their aluminum and silicon counterparts.

A source zeolite reagent may provide a source of aluminum or boron. In most cases, the source zeolite also provides a source of silica. The source zeolite in its dealuminated or deboronated form may also be used as a source of silica, with additional silicon added using, for example, the conventional sources listed above. Use of a source zeolite reagent as a source of alumina for the present process is more completely described in U.S. Pat. No. 5,225,179, issued Jul. 6, 1993 to Nakagawa entitled "Method of Making Molecular Sieves", the disclosure of which is incorporated herein by reference.

Typically, an alkali metal hydroxide and/or an alkaline earth metal hydroxide, such as the hydroxide of sodium, potassium, lithium, cesium, rubidium, calcium, and magnesium, is used in the reaction mixture; however, this component can be omitted so long as the equivalent basicity is maintained. The templating agent may be used to provide hydroxide ion. Thus, it may be beneficial to ion exchange, for example, the halide for hydroxide ion, thereby reducing or eliminating the alkali metal hydroxide quantity required. The alkali metal cation or alkaline earth cation may be part of the as-synthesized crystalline oxide material, in order to balance valence electron charges therein.

The reaction mixture is maintained at an elevated temperature until the crystals of the SSZ-54 zeolite are formed. The hydrothermal crystallization is usually conducted under autogenous pressure, at a temperature between 100° C. and 200° C., preferably between 135° C. and 160° C. The crystallization period is typically greater than 1 day and preferably from about 3 days to about 20 days.

Preferably, the zeolite is prepared using mild stirring or agitation.

During the hydrothermal crystallization step, the SSZ-54 crystals can be allowed to nucleate spontaneously from the reaction mixture. The use of SSZ-54 crystals as seed material can be advantageous in decreasing the time necessary for complete crystallization to occur. In addition, seeding can lead to an increased purity of the product obtained by promoting the nucleation and/or formation of SSZ-54 over any undesired phases. When used as seeds, SSZ-54 crystals are added in an amount between 0.1 and 10% of the weight of silica used in the reaction mixture.

Once the zeolite crystals have formed, the solid product is separated from the reaction mixture by standard mechanical separation techniques such as filtration. The crystals are water-washed and then dried, e.g., at 90° C. to 150° C. for from 8 to 24 hours, to obtain the as-synthesized SSZ-54 zeolite crystals. The drying step can be performed at atmospheric pressure or under vacuum.

SSZ-54 as prepared has a mole ratio of an oxide selected from silicon oxide, germanium oxide and mixtures thereof to an oxide selected from aluminum oxide, gallium oxide, iron oxide, boron oxide, titanium oxide, indium oxide, vanadium oxide and mixtures thereof greater than about 20; and has, after calcination, the X-ray diffraction pattern of FIG. 1. SSZ-54 further has a composition, as synthesized (i.e., prior to removal of the templating agent from the zeolite) and in the anhydrous state, in terms of mole ratios, shown in Table B below.

TABLE B

| As-Synthesized SSZ-54 | |
|---|---|
| $YO_2/W_cO_d$ | 25–100 |
| $M_{2/n}/YO_2$ | 0.02–0.06 |
| $Q/YO_2$ | 0.01–0.04 | where Y, W, c, d, M, n and Q are as defined above.

SSZ-54 can be made essentially aluminum free, i.e., having a silica to alumina mole ratio of A. A method of increasing the mole ratio of silica to alumina is by using standard acid leaching or chelating treatments. However, essentially aluminum-free SSZ-54 can be synthesized directly using essentially aluminum-free silicon sources as the main tetrahedral metal oxide component, if boron is also present. SSZ-54 can also be prepared directly as either an aluminosilicate or a borosilicate.

Lower silica to alumina ratios may also be obtained by using methods which insert aluminum into the crystalline framework. For example, aluminum insertion may occur by thermal treatment of the zeolite in combination with an alumina binder or dissolved source of alumina. Such procedures are described in U.S. Pat. No. 4,559,315, issued on Dec. 17, 1985 to Chang et al.

It is believed that SSZ-54 is comprised of a new framework structure or topology which is characterized by its X-ray diffraction pattern. After calcination, the SSZ-54 zeolites have a crystalline structure whose X-ray powder diffraction pattern exhibits the characteristic lines of FIG. 1.

The X-ray powder diffraction patterns were determined by standard techniques. The radiation was the K-alpha/doublet of copper.

Minor variations in the diffraction pattern can result from variations in the silica-to-alumina or silica-to-boron mole ratio of the particular sample due to changes in lattice constants. In addition, sufficiently small crystals will affect the shape and intensity of peaks, leading to significant peak broadening.

Representative peaks from the X-ray diffraction pattern of calcined SSZ-54 are shown in FIG. 1. Calcination can also result in changes in the intensities of the peaks as compared to patterns of the "as-made" material, as well as minor shifts in the diffraction pattern. The zeolite produced by exchanging the metal or other cations present in the zeolite with various other cations (such as $H^+$ or $NH_4^+$) yields essentially the same diffraction pattern, although again, there may be minor shifts in the interplanar spacing and variations in the relative intensities of the peaks. Notwithstanding these minor perturbations, the basic crystal lattice remains unchanged by these treatments.

Crystalline SSZ-54 can be used as-synthesized, but preferably will be thermally treated (calcined). Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica to alumina mole ratio. The zeolite can also be steamed; steaming helps stabilize the crystalline lattice to attack from acids.

The zeolite can be used in intimate combination with hydrogenating components, such as tungsten, vanadium, molybdenum, rhenium, nickel, cobalt, chromium, manganese or a noble metal, such as palladium or platinum, for those applications in which a hydrogenation-dehydrogenation function is desired.

Metals may also be introduced into the zeolite by replacing some of the cations in the zeolite with metal cations via standard ion exchange techniques (see, for example, U.S. Pat. No. 3,140,249 issued Jul. 7, 1964 to Plank et al.; U.S. Pat. No. 3,140,251 issued Jul. 7, 1964 to Plank et al.; and U.S. Pat. No. 3,140,253 issued Jul. 7, 1964 to Plank et al.). Typical replacing cations can include metal cations, e.g., rare earth, Group IA, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn and Fe are particularly preferred.

The hydrogen, ammonium and metal components can be ion-exchanged into the SSZ-54. The zeolite can also be impregnated with the metals, or the metals can be physically and intimately admixed with the zeolite using standard methods known to the art.

Typical ion-exchange techniques involve contacting the zeolite with a solution containing a salt of the desired replacing cation or cations. Although a wide variety of salts can be employed, chlorides and other halides, acetates, nitrates and sulfates are particularly preferred. The zeolite is usually calcined prior to the ion-exchange procedure to remove the organic matter in the channels and on the surface, since this results in a more effective ion exchange. Representative ion exchange techniques are disclosed in a wide variety of patents including U.S. Pat. No. 3,140,249 issued Jul. 7, 1964 to Plank et al.; U.S. Pat. No. 3,140,251 issued Jul. 7, 1964 to Plank et al. and U.S. Pat. No. 3,140,253 issued on Jul. 7, 1964 to Plank et al.

Following contact with the salt solution of the desired replacing cation, the zeolite is typically washed with water and dried at temperatures ranging from 65° C. to about ranging from about 200° C. to about 800° C. for periods of time ranging from 1 to 48 hours, or more, to produce a catalytically active product especially useful in hydrocarbon conversion processes.

Regardless of the cations present in the synthesized form of SSZ-54, the special arrangement of the atoms which form the basic crystal lattice of the zeolite remains essentially unchanged.

SSZ-54 can be formed into a wide variety of physical shapes. Generally speaking, the zeolite can be in the form of a powder, a granule or a molded product, such as extrudate having a particle size sufficient to pass through a 2-mesh (Tyler) screen and be retained on a 400-mesh (Tyler) screen. In cases where the catalyst is molded, such as by extrusion with an organic binder, the zeolite can be extruded before drying, or dried or partially dried and then extruded.

SSZ-54 can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al. and U.S. Pat. No. 5,316,753, issued May 31, 1994 to Nakagawa, both of which are incorporated by reference herein in their entirety.

SSZ-54 can be employed in catalysts useful for catalyzing hydrocarbon conversion reactions such as hydrocracking, dewaxing, isomerization and the like.

EXAMPLES

The following examples demonstrate but do not limit the present invention.

Example 1

Preparation of SSZ-54

Into the Teflon cup of a Parr 23 ml reactor is placed 2 ml of a 1N KOH solution, 4 grams of water and 0.30 grams of N-isopropyl ethylenediamine. The resulting mixture is mixed by hand. 1.27 Grams of Ludox AS-30 colloidal silica (30% $SiO_2$) is added and then 0.90 gram of Nalco 1056 colloidal silica particles coated with $Al_2O_3$ is added last. The resulting reaction mixture has a silica/alumina mole ratio ("SAR") of 30. The reactor is sealed and heated at 170° C. with 43 RPM tumbling for four weeks. Analysis by XRD shows the product to be SSZ-54.

Example 2

Preparation of SSZ-54

A reaction is carried out as described in Example 1 except that the SAR is adjusted to 40 by using 1.47 grams Ludox AS-30 colloidal silica and 0.62 gram Nalco 1056 colloidal silica. A product is produced after two weeks and identified by XRD as SSZ-54.

Example 3

Preparation of SSZ-54

A reaction is carried out as described in Example 1 except that the SAR is adjusted to 50 by using 1.57 grams Ludox AS-30 colloidal silica and 0.52 gram Nalco 1056 colloidal silica. A product is produced after three weeks and identified by XRD as mostly SSZ-54 with a minor amount of cristobalite.

Example 4

Preparation of SSZ-54

0.088 Gram of Reheis F-200 dried aluminum hydroxide gel (50–53 wt.% $Al_2O_3$) is dissolved in 3 ml of a 1N KOH solution, 8.4 grams water and 0.40 gram N-isopropyl ethylenediamine. 0.90 Gram of Cabosil M5 fumed silica is blended into the resulting reaction mixture and the reactor is closed, sealed and heated at 170° C. with 45 RPM tumbling. At nine days of run time, the reaction mixture is cooled and the product is collected and washed. XRD analysis shows the product to be SSZ-54. The product had a SAR of 36.

Example 5

Preparation of SSZ-54

In the Teflon cup of a Parr 23 ml reactor, 3 grams of 1 N KOH solution, 5 grams of water and 1.90 grams of Ludox AS-30 colloidal silica are mixed. Then 0.07 gram (0.5 Nalco 1056 colloidal silica (26 wt.% silica coated with 4 wt. % alumina) is added with spatula stirring. 0.22 Grams of isobutylamine is added and the reactor is closed and heated at 170° C. with 43 rpm tumbling. After six days, a sample is taken for scanning electron microscopy. A crystalline material is recovered and found by XRD to be SSZ-54.

Examples 6–9

Reactions are run in a manner similar to that described in Example 1 using the reagents shown in the table below. Amounts of reagents are in grams; the seeds are previously made SSZ-54. The product of each reaction is also shown in the table.

| Ex. No. | 1N KOH | Reheis F-2000 | Q[a] | Nyacol[b] | $H_2O$ | Seeds | Rxn. mix. SAR | Product |
|---|---|---|---|---|---|---|---|---|
| 6 | 3.0 | 0.10 | 0.40 | 2.25 | 5.0 | 0.05 | 30 | SSZ-54 |
| 7 | 3.0 | 0.08 | 0.40 | 2.25 | 5.0 | 0.05 | 37 | SSZ-54 |
| 8 | 3.0 | 0.06 | 0.40 | 2.25 | 5.0 | 0.05 | 50 | SSZ-54 |
| 9 | 3.0 | 0.02 | 0.40 | 2.25 | 5.0 | 0.05 | 150 | Cristobalite + Minor SSZ-54 |

[a] N-isopropyl ethylenediamine
[b] colloidal silica (40% $SiO_2$)

Example 10

Calcination of SSZ-54

The material from Example 1 is calcined in the following manner. A thin bed of material is heated in a muffle furnace from room temperature to 120° C. at a rate of 1° C. per minute and held at 120° C. for three hours. The temperature is then ramped up to 540° C. at the same rate and held at this temperature for 5 hours, after which it is increased to 594° C. and held there for another 5 hours. A 50/50 mixture of air and nitrogen is passed over the zeolite at a rate of 20 standard cubic feet per minute during heating.

Example 11

$NH_4$ Exchange

Ion exchange of calcined SSZ-54 material (prepared in Example 10) is performed using $NH_4NO_3$ to convert the zeolite from its $Na^+$ form to the $NH_4+$ form, and, ultimately, the $H^+$ form. Typically, the same mass of $NE_4NO_3$ as zeolite is slurried in water at a ratio of 25–50:1 water to zeolite. The exchange solution is heated at 95° C. for 2 hours and then filtered. This procedure can be repeated up to three times. Following the final exchange, the zeolite is washed several times with water and dried. This $NH_4^+$ form of SSZ-54 can then be converted to the $H^+$ form by calcination (as described in Example 9) to 540° C.

Example 12

Constraint Index Determination

The hydrogen form of the zeolite of Example 11 is pelletized at 2–3 KPSI, crushed and meshed to 20–40, and then >0.50 gram is calcined at about 540° C. in air for four hours and cooled in a desiccator. 0.50 Gram is packed into a ⅜inch stainless steel tube with alundum on both sides of the zeolite bed. A Lindburg furnace is used to heat the reactor tube. Helium is introduced into the reactor tube at 10 cc/min. and at atmospheric pressure. The reactor is heated to about 800° F., and a 50/50 (w/w) feed of n-hexane and 3-methylpentane is introduced into the reactor at a rate of 8 μl/min. Feed delivery is made via a Brownlee pump. Direct sampling into a gas chromatograph begins after 10 minutes of feed introduction. The Constraint Index value is calculated from the gas chromatographic data using methods known in the art, and is found to be 21. At 800° F. and 40 minutes on-stream, feed conversion was 40%.

What is claimed is:

1. A zeolite having a mole ratio greater than about 20 of an oxide of a first tetravalent element to an oxide of a second tetravalent element which is different from said first tetravalent element, trivalent element, pentavalent element or mixture thereof and having, after calcination, the X-ray diffraction pattern of FIG. 1.

2. A zeolite having a mole ratio greater than about 20 of an oxide selected from the group consisting of silicon oxide, germanium oxide and mixtures thereof to an oxide selected from aluminum oxide, gallium oxide, iron oxide, boron oxide, titanium oxide, indium oxide, vanadium oxide and mixtures thereof, and having, after calcination, the X-ray diffraction pattern of FIG. 1.

3. A zeolite according to claim 2 wherein the oxides comprise silicon oxide and aluminum oxide.

4. A zeolite according to claim 2 wherein the oxides comprise silicon oxide and boron oxide.

5. A zeolite according to claim 1 wherein said zeolite is predominantly in the hydrogen form.

6. A zeolite according to claim 1 wherein said zeolite is substantially free of acidity.

7. A zeolite having a composition, as synthesized and in the anhydrous state, in terms of mole ratios as follows:

| | |
|---|---|
| $YO_2/W_cO_d$ | 25–100 |
| $M_{2/n}/YO_2$ | 0.02–0.06 |
| $Q/YO_2$ | 0.01–0.04 | wherein Y is silicon, germanium or a mixture thereof; W is aluminum, gallium, iron, boron, titanium, indium, vanadium or mixtures thereof; c is 1 or 2; d is 2 when c is 1 or d is 3 or 5 when c is 2; M is an alkali metal cation, alkaline earth metal cation or mixtures thereof; n is the valence of M; and Q comprises N-isopropyl ethylenediamine, or a mixture of 1-N-isopropyl diethylenetriamine and isobutylamine.

8. A zeolite according to claim 7 wherein W is aluminum and Y is silicon.

9. A zeolite according to claim 7 wherein W is boron and Y is silicon.

10. A zeolite according to claim 7 wherein Q is N-isopropyl ethylenediamine.

11. A zeolite according to claim 7 wherein Q is a mixture of 1-N-isopropyl diethylenetriamine and isobutylamine.

12. A method of preparing a crystalline material comprising an oxide of a first tetravalent element and an oxide of a second tetravalent element which is different from said first tetravalent element, trivalent element, pentavalent element or mixture thereof, said method comprising contacting under crystallization conditions sources of said oxides and a templating agent comprising N-isopropyl ethylenediamine, or a mixture of 1-N-isopropyl diethylenetriamine and isobutylamine.

13. The method according to claim 12 wherein the first tetravalent element is selected from the group consisting of silicon, germanium and combinations thereof.

14. The method according to claim 12 wherein the second tetravalent element, trivalent element or pentavalent element is selected from the group consisting of aluminum, gallium, iron, boron, titanium, indium, vanadium and combinations thereof.

15. The method according to claim 14 wherein the second tetravalent element or trivalent element is selected from the group consisting of aluminum, boron, titanium and combinations thereof.

16. The method according to claim 15 wherein the first tetravalent element is silicon.

17. The method according to claim 12 wherein the templating agent is N-isopropyl ethylenediamine.

18. The method according to claim 12 wherein the templating agent is a mixture of 1-N-isopropyl diethylenetriamine and isobutylamine.

19. The method of claim 12 wherein the crystalline material has, after calcination, the X-ray diffraction pattern of FIG. 1.

* * * * *